(12) United States Patent
Morishima et al.

(10) Patent No.: US 6,240,797 B1
(45) Date of Patent: Jun. 5, 2001

(54) LINEAR ACTUATOR WITH ANTI-REVERSE-ROTATION MECHANISM

(75) Inventors: Satoshi Morishima, Osaka; Takaki Tsuruzono, Katano, both of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/441,770

(22) Filed: Nov. 17, 1999

(30) Foreign Application Priority Data

Nov. 17, 1998 (JP) .................................................. 10-326896

(51) Int. Cl.⁷ .................................................. F16H 25/22
(52) U.S. Cl. .................................... 74/89.15; 74/424.8 R; 188/134; 192/223
(58) Field of Search ............................... 74/424.8 R, 459, 74/89.15; 192/223, 223.1, 223.2, 223.3; 188/134

(56) References Cited

U.S. PATENT DOCUMENTS

| | | | |
|---|---|---|---|
| 2,653,691 | * | 9/1953 | Weiland .............................. 192/223.1 |
| 3,802,281 | * | 4/1974 | Clarke ................................. 74/89.15 |
| 3,898,890 | * | 8/1975 | Simmons et al. .................... 74/89.15 |
| 4,834,225 | * | 5/1989 | Klopfenstein et al. ............... 192/223 |
| 5,655,636 | * | 8/1997 | Lang et al. .......................... 192/223 |

FOREIGN PATENT DOCUMENTS 8-322189  12/1996  (JP) .

* cited by examiner

*Primary Examiner*—Allan D. Herrmann
(74) *Attorney, Agent, or Firm*—Dann, Dorfman, Herrell and Skillman; Henry H. Skillman (57) ABSTRACT

A linear actuator includes two axially opposed bearings with built-in one-way clutch assembled in a housing member with respective outer races secured to the housing member such that respective directions in which inner races of the bearings are locked against rotation are opposed to each other, a ball bearing shaft relatively and rotatably supported on the inner races of the bearings with bearing bushings disposed between the ball screw shaft and the respective bearings, and two load transmitting collars fixed on the ball screw shaft. When the ball screw shaft is subjected to a thrust load applied from a ball nut in a direction to retract the ball screw shaft, one of the inner race is locked against rotation to thereby exert a braking torque to the corresponding load transmitting collar via an associated friction collar. Alternatively, when the ball screw shaft is subjected to a thrust load tending to extend the ball screw shaft, the other inner race is locked against rotation to thereby exert a braking torque to the corresponding load transmitting collar via an associated friction collar. Thus, rotation of the ball screw shaft under the effect of the thrust load in either direction can be avoided.

5 Claims, 5 Drawing Sheets

LINEAR ACTUATOR WITH ANTI-REVERSE-ROTATION MECHANISM

BACKGROUND OF THE INVENTION

1. Field of the Invention

The present invention relates generally to a ball-screw-driven linear actuator for lifting up and down a heavy load, and more particularly to a linear actuator including an anti-reverse-rotation mechanism for preventing an actuating member from moving in a loaded direction due to rotation of a ball screw when rotation of the ball screw is stopped under the condition in which the actuating member reciprocally movable in unison with a ball nut is subject to a thrust load.

2. Description of the Related Art

In a handling work for lifting up and down heavy-weight articles, screw-driven linear actuators are widely used. The screw-driven linear actuators are constructed such that by rotating a screw shaft by means of a rotary drive source such as a reversible motor, an actuating member adapted to be subjected to a load such as the weight of a heavy article is driven to move back and forth in the axial direction of the screw shaft via a nut threaded with the screw shaft.

Many such known screw-driven linear actuators employ a ball screw mechanism which consists of a threaded shaft (ball screw shaft) linked to a threaded nut (ball nut) by balls constrained to roll the space formed by the threads, in order to reduce friction. The ball screw mechanism is advantageous for its capability of achieving a smooth motion-converting operation with reduced drive torque.

Apart from its high transmission efficiency, the linear actuators using the ball screw mechanism have a problem that when the ball nut is subject to a thrust load while rotation of the ball screw shaft is stopped, the thrust load tends to rotate the ball screw, thereby causing the actuating member to move in a direction of load (loaded direction) with the heavy-weight article supported thereon.

To cope with this problem, various improvements have been proposed, such as disclosed in Japanese Patent Laid-open Publication No. HEI 8-322189.

The Japanese publication specified above shows a linear actuator equipped with a mechanism for preventing rotation of a ball screw which would otherwise occur due to the effect of a thrust load. More specifically, the linear actuator, as re-illustrated here in FIG. 5, includes a worm wheel A3 rotatably supported within a housing A1 by means of a ball bearing A2 which is capable of bearing both a radial load and a thrust load. One end (proximal end) of a ball screw shaft A4 is firmly fitted in a central hole (not designated) of the worm wheel A3 for co-rotation therewith. Rotation of an electric motor (not shown) is transmitted from a worm A5 through the worm wheel A3 meshing with the worm A5 to the ball screw shaft A4. Rotation of the ball screw shaft A4 is converted into linear reciprocating motion of an actuating member (not shown) connected to a ball nut (not shown) threaded with a screw portion (not shown) formed on the distal end side of the ball screw shaft A4.

Figure 5:
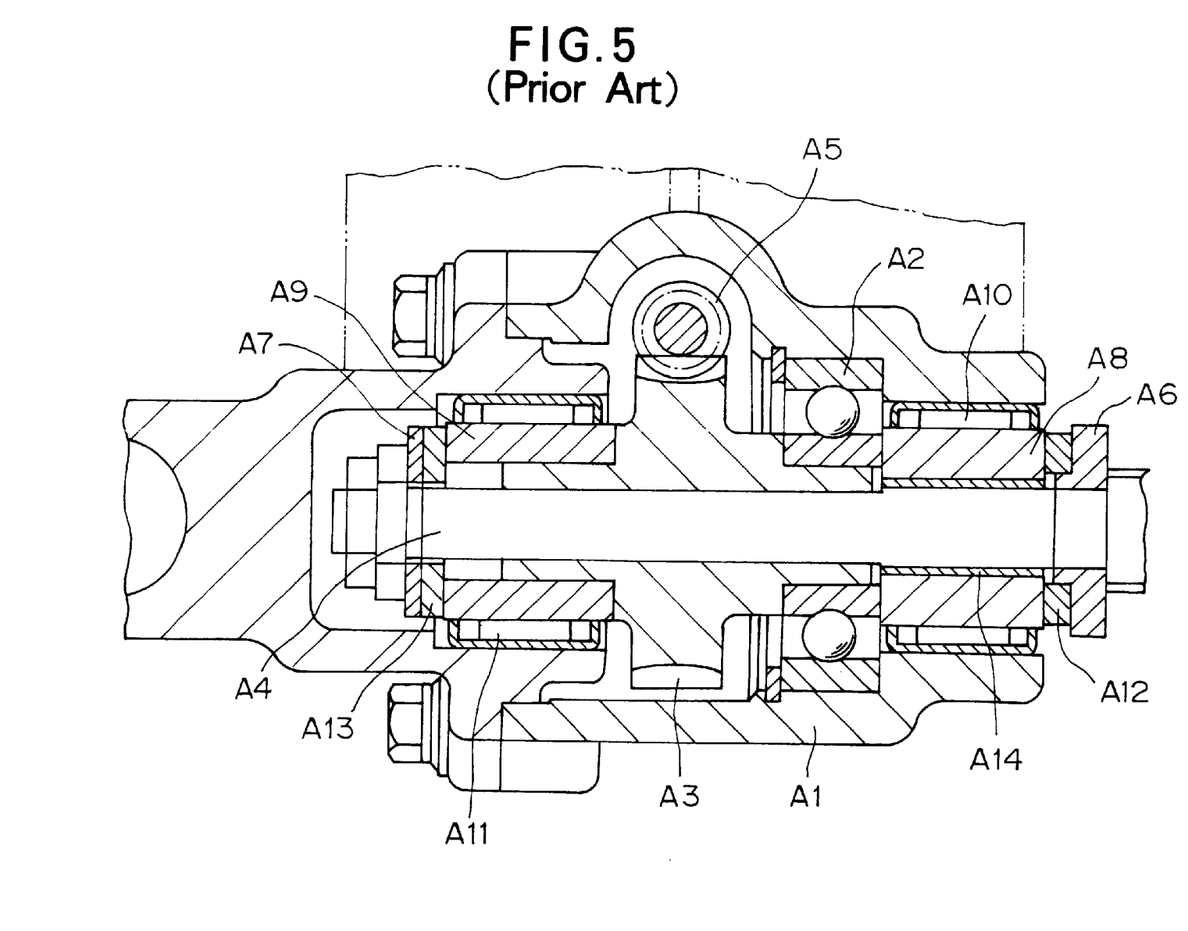
FIG. 5 is a cross-sectional view showing a portion of a conventional linear actuator having an anti-reverse-rotation mechanism.

On the ball screw shaft A4, there are assembled two sets of components, each component set including one washer A6 or A7, one sleeve A8 or A9, one roller clutch A10 or A11, and one friction plate A12 or A13. The roller clutches A10, A11 are mounted such that respective free-rotating directions of the roller clutches A10, A11 are opposite to each other. With this arrangement, one of the roller clutches A10 (A11) operates to lock the associated sleeve A8 (A9) against rotation in one direction, while the other roller clutch A11 (A10) permits rotation of the associated sleeve A9 (A8) in the same direction.

The washers A6, A7 are fixed to the ball screw shaft A4. In the linear actuator, when the ball screw shaft A4 while being stopped is subjected to a thrust load in one direction tending to retract the ball screw shaft (hereinafter referred to as "retracting direction"), the thrust load is born by the ball bearing A2 successively through the washer A6, friction plate A12 and sleeve A8 that are disposed on the right-hand side in FIG. 5.

In this instance, the ball nut (not shown) applies a force tending to rotate the ball screw shaft A4 (hereinafter referred to as "rotating force"). However, since the roller clutch A10 is designed to lock the sleeve A8 against rotation in the acting direction of the rotating force, a braking torque is applied from the sleeve A8 through the friction plate A12 to the washer A6 and thus prevents rotation of the ball screw shaft A4.

When the ball nut is to be advanced against the thrust load of the retracting direction, the ball screw shaft A4 is rotated in the opposite direction to the rotating force whereupon the roller clutch A10 releases the sleeve A8 to thereby allow freewheeling of the sleeve A8.

In this instance, the roller clutch A11 locks the sleeve A9 against rotation. However, since the ball screw shaft A4 is still subjected to the thrust load of the retracting direction, the washer A7 is not forced against the friction plate A13. Additionally, since the worm wheel A3 is freely rotatable relative to the sleeve A9, no braking torque is produced with respect to the ball screw shaft A4.

When the ball screw shaft A4 is rotated to retract the ball nut in the same direction as the thrust load, the roller clutch A10 locks the sleeve A8 against rotation. Accordingly, the washer A6 is rotating while being subjected to a braking torque applied thereto from the locked sleeve A8 through the friction plate A12.

In the case where the ball screw shaft A4 while being stopped is subjected to a thrust load in the opposite direction tending to extend the ball screw shaft A4 (hereinafter referred to as "extending direction"), the thrust load is born by the ball bearing A2 successively through the washer A7, friction plate A13, sleeve A9 and worm wheel A3 that are disposed on the left-hand side in FIG. 5.

In this instance, a rotating force in the opposite direction to the thrust load of the retracting direction is applied from the ball nut (not shown) to the ball screw shaft A4. However, since the roller clutch A11 locks the sleeve A9 against rotation in the direction of the rotating force, a braking torque is applied from the sleeve A9 through the friction plate A13 to the washer A7 which is secured to the ball screw shaft A4. Thus, rotation of the ball screw shaft A4 is prevented.

When the ball nut is to be retracted against the thrust load of the extending direction, the ball screw shaft A4 is rotated in the opposite direction to the rotating force whereupon the roller clutch A11 releases the sleeve A9 to thereby allow freewheeling of the sleeve A9.

In this instance, the roller clutch A10 locks the sleeve A8 against rotation. However, since the ball screw shaft A4 is still subjected to the thrust load of the extending direction, the washer A6 is not forced against the friction plate A12. Additionally, since the ball screw shaft A4 is freely rotatable relative to a sleeve bearing A14 disposed interiorly of the sleeve A9, no braking torque is produced with respect to the screw the ball screw shaft A4.

When the ball screw shaft A4 is rotated to advance the ball nut in the same direction as the thrust load of the extending direction, the roller clutch A11 locks the sleeve A9 against rotation. Accordingly, the washer A7 is rotating while being subjected to a braking torque applied thereto from the locked sleeve A9 through the friction plate A13.

In the conventional linear actuator shown in FIG. 5, the sleeves and the one-way clutches are used in combination to form two sleeve-and-clutch pairs. Since the sleeve-and-clutch pairs are disposed in series with the ball bearing in the axial direction of the ball screw shaft, the overall axial length of the conventional linear actuator is relatively large. Additionally, due to a relatively large number of parts used, the conventional linear actuator requires a relatively long time for assembly and adjustment which might increase the manufacturing cost of the linear actuator.

SUMMARY OF THE INVENTION

With the foregoing problems in view, it is an object of the present invention to provide a linear actuator including an anti-reverse-rotation mechanism, which has a relatively small axial size, is composed of a relatively small number of parts, requires a relatively short period of time for assembly and adjustment, and can be manufacturing at a relatively low cost.

To accomplish the above-mentioned object, a linear actuator according to the present invention includes two axially opposed bearings with built-in one-way clutch, each bearing including an outer race and an inner race, a plurality of rolling elements capable of bearing both a radial load and a thrust load and assembled between the outer race and the inner race, and a plurality of clutch elements assembled between the outer and inner race in juxtaposed relation to the rolling elements in the axial direction of the bearing, the clutch elements being cooperative to permit relative rotation between the outer race and the inner race in one direction only. The bearings are assembled in a housing member with the respective outer races firmly connected to the housing member such that a directions in which rotation of the inner race of one of the bearings is locked is opposite to a direction in which rotation of the inner race of the other bearing is locked. A ball screw shaft extends through the respective inner races of the bearings and is relatively and rotatably supported on the inner races with a bearing bushing disposed therebetween. The ball screw shaft has a ball screw portion formed thereon and is driven to rotate in both forward and reverse directions by means of a rotary drive source. A ball nut is threaded with the ball screw portion of the ball screw shaft with a plurality of balls disposed therebetweern. An actuating member is supported by the housing member in such a manner that the actuating member is reciprocally movable in unison with the ball nut in the axial direction of the ball screw shaft for projection and retracting relative to the housing member while it is prevented from rotating about the axis of the ball screw shaft. A first friction collar and a second friction collar are rotatably mounted on the ball screw shaft, and at least one load transmitting collar is fixedly mounted on the ball screw shaft. The load transmitting collar has a first end face facing an end face of the inner race of one of the bearings with the first friction collar disposed therebetween, and a second end face facing an end face of the inner race of the other bearing with the second friction collar disposed therebetween. The inner race of said one bearing being locked against rotation when the ball screw shaft is subjected to a first thrust load tending to retract the ball screw shaft. The inner race of the other bearing is locked against rotation when the ball screw shaft is subjected to a second thrust load tending to extend the ball screw shaft. When the ball screw shaft is subjected to the first thrust load, the load transmitting collar transmits the first thrust load through the first friction collar to the inner race of said one bearing, and when the ball screw shaft is subjected to the second thrust load, the load transmitting collar transmits the second thrust load through the second friction collar to the inner race of the other bearing.

With this construction, when the ball screw shaft is subjected to a thrust load applied via the ball nut in a direction to retract the ball screw shaft, one of the inner race is locked against rotation to thereby exert a braking torque to the load transmitting collar via the first friction collar. Alternatively, when the ball screw shaft is subjected to a thrust load tending to extend the ball screw shaft, the other inner race is locked against rotation to thereby exert a braking torque to the transmitting collar through the second friction collar. Thus, rotation of the ball screw shaft under the effect of the thrust load in either direction can be avoided.

In one preferred form, the load transmitting collar is a single load transmitting collar disposed between the bearings and having opposite end faces forming the first and second end faces, respectively. The bearing bushing is composed of two bushing members each associated with one of the bearings, and the first and second friction collars are each formed as an integral part of a corresponding one of the bushing members.

In another preferred form, the number of the load transmitting collar is two, and the two load transmitting collars are disposed on opposite sides of the pair of bearings. One of the two load transmitting collars has an end face forming the first end face, and the other load transmitting collar has an end face forming the second end face. The bearing bushing is composed of two bushing members each associated with one of the bearings, and said first and second friction collars are each formed as an integral part of a corresponding one of the bushing members.

The above and other objects, features and advantages of the present invention will becomes apparent to these versed in the art upon making reference to the following detailed description and accompanying sheets of drawings in which certain preferred structural embodiments incorporating the principle of the present invention are shown by way of illustrative examples.

DETAILED DESCRIPTION OF THE PREFERRED EMBODIMENTS

Certain preferred embodiments of the present invention will be described in greater detail with reference to the accompanying sheets of drawings in which like or corresponding parts are designated by the same reference characters throughout the several views.

Figure 1:
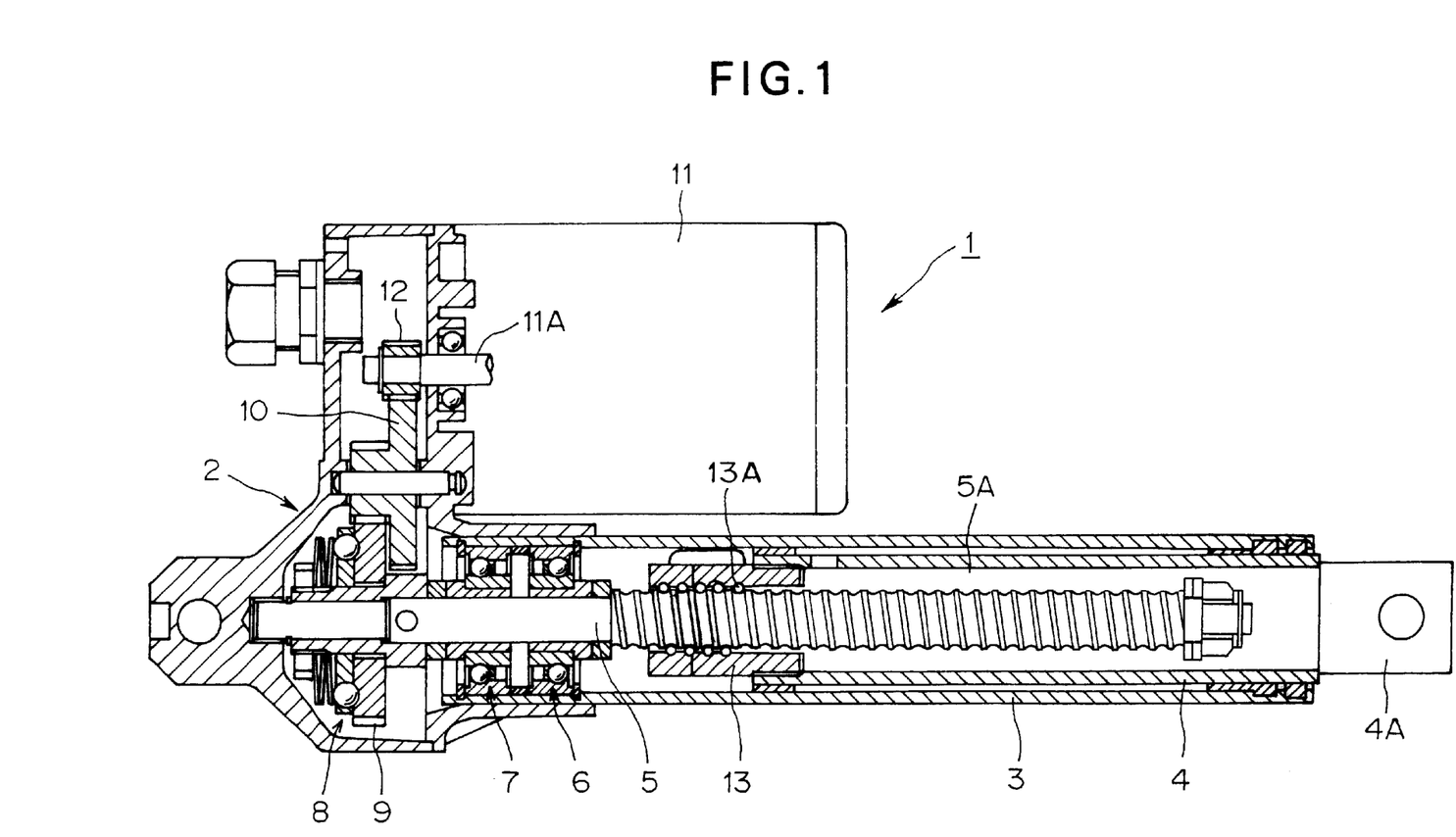
FIG. 1 is a longitudinal cross-sectional view showing a linear actuator having an anti-reverse-rotation mechanism according to a first embodiment of the present invention.

FIG. 1 shows in cross section a linear actuator with anti-reverse-rotation mechanism (hereinafter referred to, for brevity, as "linear actuator") according to a first embodiment of the present invention. The linear actuator 1 includes a housing 2, an outer cylinder 3 firmly connected at one end to the housing 2, and an inner cylinder 4 fitted in the outer cylinder 3 such that the inner cylinder 4 reciprocates for projection and retraction with respect to the outer cylinder 3. The inner cylinder 4 forms an actuating member.

The fore end of the inner cylinder 4 has a connecting portion 4A adapted to be connected to an external driven member, such as a mechanical equipment, for driving the same.

Although in the illustrated embodiment the inner cylinder 4 is not prevented from rotating relative to the housing side including the outer cylinder 3, such relative rotation is prevented by the driven member when the exterenal driven member is coupled to the connecting portion.

A ball screw shaft 5 is rotatably supported within the outer cylinder 3 by means of a pair of axially opposed bearings 6 and 7 secured to the outer cylinder 3 so that the ball screw shaft 5 is rotatably at a fixed position. The bearings 6, 7 each have a built-in one-way clutch. In the present instance, the clutch is a one-way brake preventing rotation in one direction, and permitting rotation in the opposite direction.

The ball screw shaft 5 has a proximal end (left end in FIG. 1) to which a driven gear 9 is attached via a torque limiter 8. The driven gear 9 is in driven mesh with a drive pinion 12 via an internal gear 10 rotatably supported within the housing 2. The drive pinion 12 is firmly connected to an output shaft 11A of a reversible rotary drive source which is rotatably both in forward and reverse directions.

The rotary drive source 11 may be a DC (direct current) motor. The torque limiter 8 is incorporated in order to protect the linear actuator 1 by permitting freewheeling of the driven gear 9 relative to the ball screw shaft 5 when a load acting on the ball screw shaft 5 exceeds a predetermined value.

The ball screw shaft 5 has a threaded screw portion 5A formed on a portion thereof located on a distal end side (left-hand side in FIG. 1) of the bearings 6, 7. A ball nut 13 is threaded with the screw portion 5A with a plurality of balls 13A constrained to roll in the space formed between the threads. The ball nut 13 is firmly secured to a base end (left end in FIG. 1) of the inner cylinder 4.

Since rotation of the inner cylinder 4 relative to the outer cylinder 3 is prevented by the external driven member, when the ball screw shaft 4 is driven in rotation by the rotary drive source 11, the ball nut 13 moves back and forth depending on the rotating direction of the ball screw shaft 5. Reciprocating movement of the ball nut 13 causes the inner cylinder 4 to project from or retract into the outer cylinder 3 with the result that the driven member, such as mechanical equipment(not shown) is actuated via the connecting portion 4A provided on the fore end of the inner cylinder 4.

In the illustrated embodiment, rotation of the inner cylinder is prevented by the external driven member connected to the connecting portion 4A of the inner cylinder 4. As an alternative, the outer and inner cylinders 3, 4 may be constructed to have an anti-rotation mechanism for preventing relative rotation between these two cylinders 3, 4.

Figure 2:
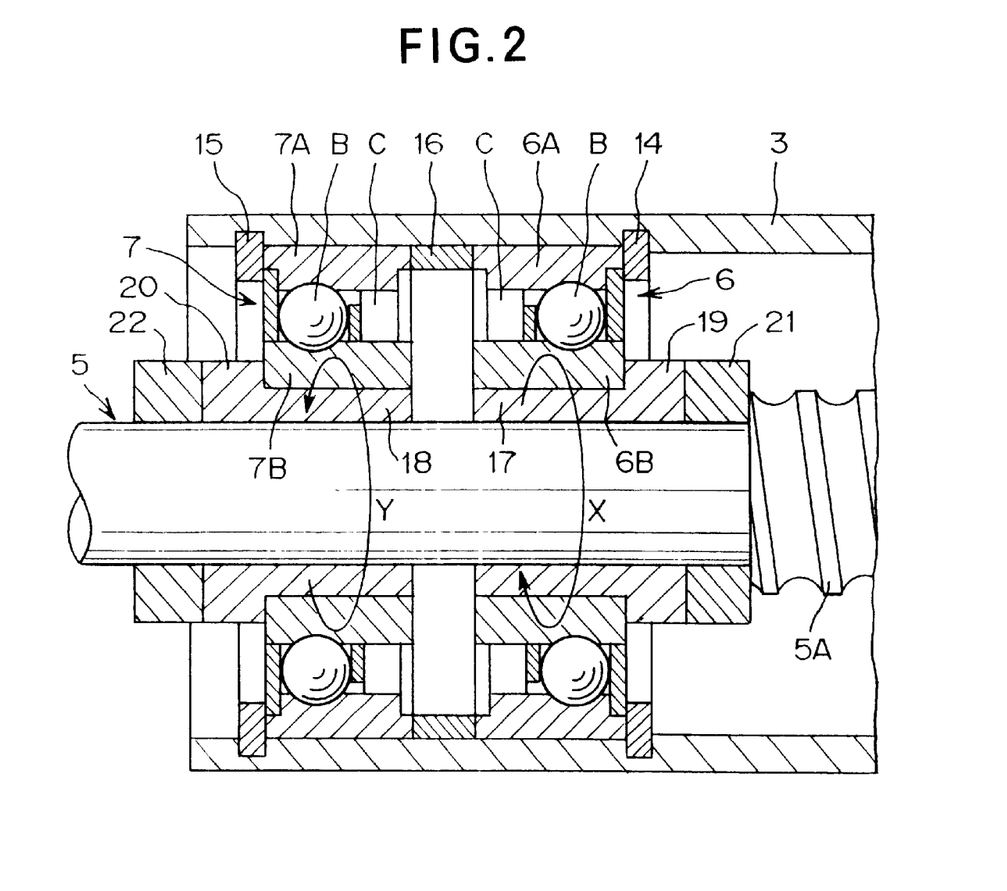
FIG. 2 is an enlarged view showing a portion of FIG. 1 including the anti-reverse-rotation mechanism.

The bearings 6, 7 with built-in clutch (hereinafter referred to, for brevity, as "bearings") are constructed as follows. The ball bearings 6, 7, as shown in FIG. 2, each include an outer race 6A, 7A and an inner race 6B, 7B disposed concentrically with each other. A plurality of rolling elements in the form of balls B are assembled in an annular space between the outer and inner races 6A and 6B; 7A and 7B at one side of the space in the axial direction of the bearing 6, 7. The balls B are held by a ball retainer cage (not shown) in equally spaced relation in the circumferential direction of the bearing 6, 7.

The inner race 6B, 7B has a circumferential groove of an arcuate cross section formed in an outer peripheral surface thereof. Similarly, the outer race 6A, 7A has a circumferential groove of an arcuate cross section formed in an inner peripheral surface thereof. The outer and inner races 6A, 6B; 7A, 7B and the balls B together form a deep groove ball bearing which is capable of bearing both a radial load and a thrust load.

A plurality of clutch elements in the form of cams C are assembled in the space between the outer and inner races 6A and 6B; 7A and 7B in juxtaposed relation to the respective balls B in the axial direction of the bearing 6, 7. The cams C are held by a cam retainer cage (not shown) in equally spaced relation in the circumferential direction of the bearing 6, 7. The cams C form a one-way clutch acting between the outer race 6A, 7A and the inner race 6B, 7B.

The bearings 6, 7 are mounted in the outer cylinder 3 with outer peripheral surfaces of the respective outer races 6A, 7A press-fitted with an inner peripheral surface of the outer cylinder 3. The bearings 6, 7 are set in position against displacement in the axial direction of the ball screw shaft 5 by means of a pair of stop rings 14, 15 snap-fitted in a pair of axially spaced circumferential grooves (not designated), respectively, formed in the inner peripheral surface of the outer cylinder 3, and an annular spacer 16 disposed between the outer races 6A, 7A of the bearings 6, 7.

The bearings 6, 7 are assembled in the outer cylinder 3 such that respective directions in which the inner races of the bearings 6, 7 are permitted to rotate are opposite to each other. Thus, in the illustrated embodiment, the inner race 6B of the bearing 6 is locked against rotation in the direction indicated by the arrow X shown in FIG. 2, while the inner race 7B of the bearing 7 is located against rotation in the direction indicated by the arrow Y.

Two bearing bushings 17, 18 are press-fitted in the respective inner races 6B, 7B of the bearings 6, 7, and the ball screw shaft 5 extends through, and is rotatably supported by, the bearing bushings 17, 18.

The bearing bushings 17, 18 each have an integral annular flange formed at an outer end located remotely from another bearing bushing 18, 17. The annular flange of the bearing bushing 17 forms a first friction collar 19, and the annular flange of the bearing bushing 18 forms a second friction collar 20.

A first load transmitting collar 21 and a second load transmitting collar 22 are fixedly mounted on the ball screw shaft 5 in axially spaced relation such that respective inner end faces of the first and second load transmitting collars 21, 22 and respective outer end faces of the first and second friction collars 19, 20 are in face-to-face confrontation.

The distance between the inner end face of the first and second load transmitting collars 21, 22 is slightly greater than the distance between the outer end faces of the first and second friction collars 19, 20 so that the ball screw shaft 5 can move in the axial direction thereof within a clearance formed between each confronting pair of the load transmitting collars 21, 22 and the friction collars 19, 20.

The linear actuator 1 of the foregoing construction operates as follows.

In the condition where in FIG. 1 the rotary drive source 11 is stopped, and the connecting member 4A at the fore end of the inner cylinder 4 is subjected to a thrust load tending to retract the ball screw shaft 5, the thrust load acts on the ball screw shaft 5 through the ball nut 13 and the balls 13A.

The thrust load is then born by the inner race 6B of the bearing 6 successively through the first load transmitting collar 21 and the first friction collar 19.

The ball nut 13 while being subjected to the thrust load produces a rotational force tending to turn the ball screw shaft 5 in the direction of the arrow X shown in FIG. 2. In this instance, by virtue of frictional engagement between the first load transmitting collar 21 and the first friction collar 19, the bearing bushing 17 including the friction collar 19 and press-fitted with the inner race 6B tends to turn the inner race 6B in the direction of the arrow X. However, rotation of the inner race 6B does not take place because the built-in one-way clutch (clutch elements) C locks the inner race 6B of the bearing 6 against rotation in the direction of the arrow X.

With this locking of the inner race 6B, since the first load transmitting collar 21 is subjected to a frictional braking torque acting from the outer end face of the inner race 6B through the outer end face of the first friction collar 19 to the inner end face of the first load transmitting collar 21, rotation of the ball screw shaft 5 does not occur. Thus, the inner cylinder 4 is held in position against retracting movement toward the bearings 6, 7.

From this condition, the rotary drive source 11 is driven to rotate the ball screw shaft 5 in a direction to extend the inner cylinder 4 whereupon the inner race 6B and the friction collar 19 rotate together with the ball screw shaft 5 in the direction of the arrow Y shown in FIG. 2. In response to the rotation of the ball screw shaft 5, the ball nut 13 (FIG. 1) and the inner cylinder 4 are displaced in the projecting direction away from the bearings 6, 7.

In this instance, the inner race 7B of the bearing 7 is locked against rotation in the direction of the arrow Y. However, since the second load transmitting collar 22 does not exert a thrust load on the thus locked inner race 7B and the second friction collar 20, no braking torque is applied to the load transmitting collar 22 fixedly mounted on the ball screw shaft 5.

On the other hand, when the ball screw shaft 5 is rotated in the direction of the arrow X shown in FIG. 2 while the inner cylinder 4 is being subjected to a thrust load tending to retract the ball screw shaft 5, the inner race 6B of the bearing 6 is locked against rotation, and the load transmitting collar 21 fixedly mounted on the ball screw shaft 5 is subjected to a braking torque applied thereto from the inner race 6B via the friction collar 19.

In this instance, since the ball screw shaft 5 is rotating against the braking torque, when rotation of the ball screw shaft 5 is stopped, the ball screw shaft 5 is held stationary by the braking torque.

At the same time, since the inner race 7B of the bearing 7 is neither subjected to the thrust load nor locked against rotation in the direction of the arrow X, it does not exert a braking torque to the ball screw shaft 5.

In the case where the ball screw shaft 5 is not driven, and the inner cylinder 4 (FIG. 1) is subjected to a thrust load tending to extend the ball screw shaft 5, the thrust load is transmitted from the second load transmitting collar 22 on the ball screw shaft 5 through the second friction collar 20 to the inner race 7B of the bearing 7 and thus born by the inner race 7B.

The ball nut 13 (FIG. 1) while being subjected to the thrust load produces a rotational force tending to turn the ball screw shaft 5 in the direction of the arrow Y shown in FIG. 2. In this instance, however, rotation of the ball screw shaft 5 does not take place because the load transmitting collar 22 is subjected to a frictional braking torque applied thereto from an outer end face of the inner race 7B through the friction collar 20 due to the inner race 7B being locked against rotation in the direction of the arrow Y by means of the built-in one-way clutch (clutch elements) C of the bearing 7. Accordingly, the inner cylinder 4 is held stationary in the same manner as explained above with respect to the inner cylinder 4 being subjected to the retracting thrust load.

From this condition, the ball screw shaft 5 rotated in a direction to extend the inner cylinder 4 whereupon the built-in one-way clutch (clutch elements) C of the bearing 7 locks the inner race 7B against rotation, and the load transmitting collar 22 fixed on the ball screw shaft 5 is subjected to a frictional braking torque applied thereto from the inner race 7B through the friction collar 20.

In this instance, since the ball screw shaft 5 is rotating against the braking torque, when rotation of the ball screw shaft 5 is stopped, the ball screw shaft 5 is held stationary by the braking torque.

At the same time, since the inner race 6B of the bearing 6 is neither subjected to the thrust load nor locked against rotation in the direction of the arrow Y, it does not exert a braking torque to the ball screw shaft 5.

On the other hand, when the ball screw shaft 5 is rotated in the direction of the arrow X shown in FIG. 2 so as to retract the inner cylinder 4 while the inner cylinder 4 is being subjected to a thrust load tending to extend the ball screw shaft 5, the inner race 7B of the bearing 7 and the friction collar 20 rotate together with the ball screw shaft 5 in the direction of the arrow X shown in FIG. 2, thereby causing the inner cylinder 4 to move in the retracting direction in unison with the ball nut 13 (FIG. 1).

In this instance, the inner race 6B of the bearing 6 is locked against rotation in the direction of the arrow X. However, since the first load transmitting collar 21 does not exert a thrust load on the thus locked inner race 6B and the first friction collar 19, no braking torque is applied to the load transmitting collar 21 fixedly mounted on the ball screw shaft 5.

Figure 3:
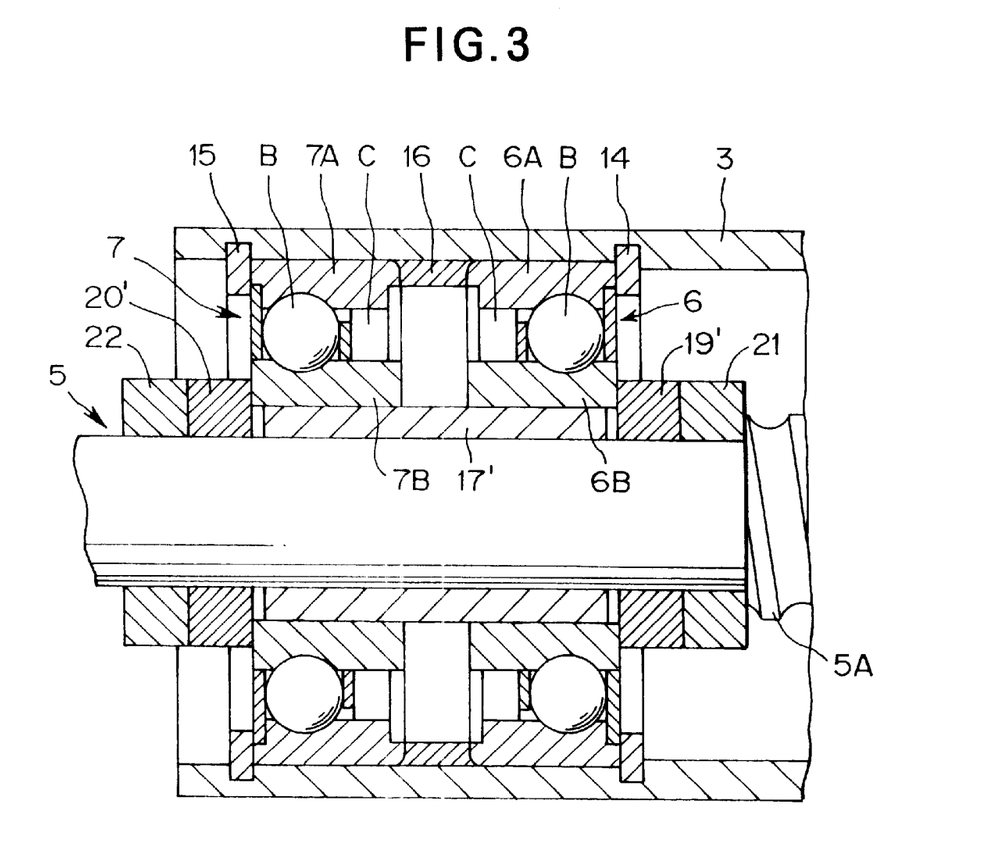
FIG. 3 is a view similar to FIG. 2, but showing a portion of a linear actuator including an anti-reverse-rotation mechanism according to a second embodiment of the present invention.

Referring now to FIG. 3, there is shown a portion of a linear actuator with anti-reverse-rotation mechanism according to a second embodiment of the present invention. In FIG. 3 these parts which are like or corresponding to those of the embodiment shown in FIG. 2 are designated by the same reference characters.

In the embodiment shown in FIG. 3, a first friction collar 19' and a second friction collar 20' are formed as a separate part structurally independent from a single bearing bushing 17' which is commonly used by the two bearings 6, 7. The respective inner races 6B, 7B of the bearings 6, 7 are rotatably fitted around an outer peripheral surface of the bearing bushing 17'.

Apart from the foregoing, the linear actuator of the second embodiment shown in FIG. 3 is the same in construction and operation as the linear actuator 1 of the first embodiment shown in FIGS. 1 and 2.

Although in the second embodiment the number of parts used is larger by one than that of the first embodiment, individual parts are simple in structure and hence easy to manufacture with the use of a material particularly suitable for the desired function of each part because, as described above, the friction collars 19', 20' are formed as a separate part structurally independent from the bearing bushing 17'.

Figure 4:
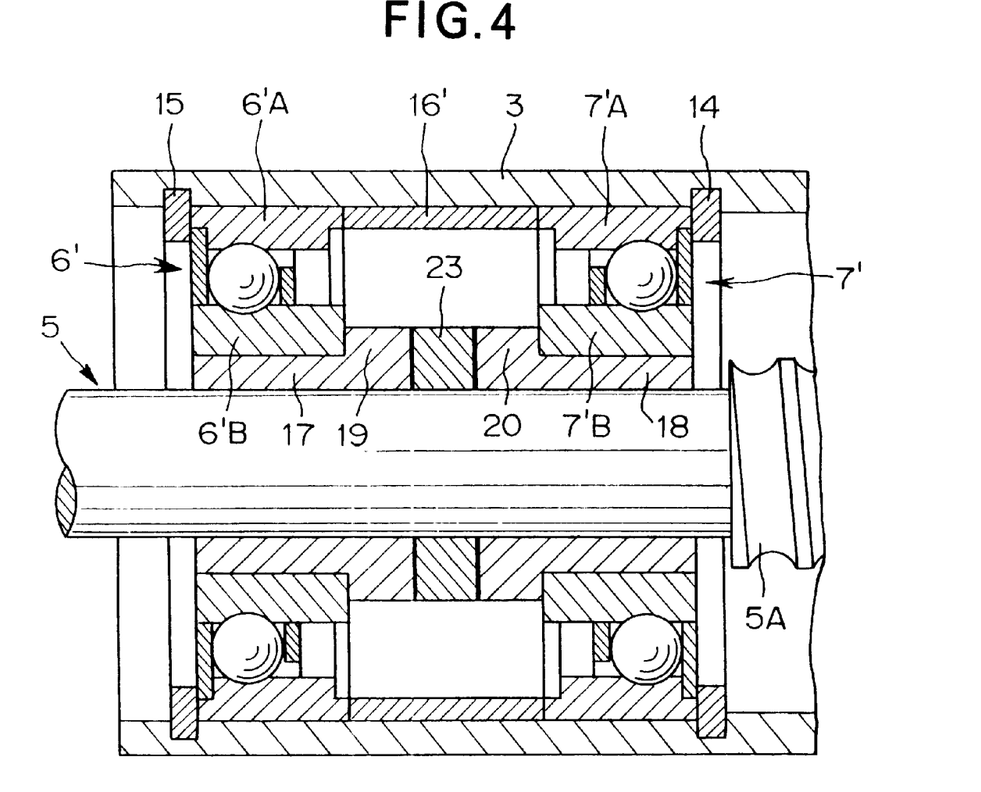
FIG. 4 is a view similar to FIG. 2, but showing a portion of a linear actuator including an anti-reverse-rotation mechanism according to a third embodiment of the present invention.

FIG. 4 shows in cross section a portion of a linear actuator with anti-reverse-rotation mechanism according to a third embodiment of the present invention. In this embodiment, a single load transmitting collar 23 is fixedly mounted on the ball screw shaft 5. The load transmitting collar 23 is sandwiched between two friction collars 19, 20 each formed as an integral part of a corresponding one of the bearing bushings 17, 18.

The bearing bushings 17, 18 are rotatably fitted around the ball screw shaft 5 in the same manner as those in the first embodiment shown in FIG. 2. The bearing bushings 17, 18 are firmly secured by press-fitting to the respective inner races 6'B, 7'B of first and second bearings 6', 7'. The bearings 6', 7' are the same in construction as the bearings 6, 7 of the first and second embodiments.

In this embodiment, however, the bearing 6', which operates to prevent rotation of the ball screw shaft 5 when the ball screw shaft 5 while being stopped is subjected to a thrust load tending to retract the ball screw shaft 5, is disposed on a side remote from the ball screw portion 5A (see FIG. 1) as compared to the bearing 7'. In other word, the bearings 6', 7' in the third embodiment are opposite in position to the bearings 6, 7 in the first and second embodiments are reversed in position.

In the third embodiment, since the single load transmitting collar 23 is used in place of the two load transmitting collars 21, 22 in the first and second embodiments, the number of parts used is reduced. Additionally, because the load transmitting collar 23 is disposed in a space defined between the bearings 6', 7' by means of a spacer 16', further structural simplification and downsizing of the linear actuator can be achieved.

Although in the embodiments described above the outer races 6A, 6'A, 7A, 7'A of the bearings 6, 6', 7, 7' are secured by press-fitting to the outer cylinder 3, a key coupling or a spline coupling may be employed to join together the outer races 6A, 6'A, 7A, 7'A of the bearings 6, 6', 7, 7' and the outer cylinder 3 while preventing relative rotation therebetween. In the latter case, a key groove is formed in the inner peripheral surface of the outer cylinder 3 and the respective outer peripheral surfaces of the outer races 6A, 6'A, 7A, 7'A.

In the illustrated embodiments, the bearings 6, 6', 7, 7' are assembled in the outer cylinder 3 which forms a part of the housing 2. As an alternative, the bearings 6, 6', 7, 7' may be directly assembled in the housing 2.

The rolling elements B assembled in the bearings 6, 6', 7, 7' should by no means be limited to the balls in the illustrated embodiments but may include taper rollers. Similarly, the clutch elements C should by no means be limited to the cams but may include rollers, ratchet pawls and coiled springs as used in the conventional one-way clutches having an outer race and an inner race.

It can be appreciated that the overall axial length of the inventive linear actuator is made smaller than that of the conventional linear actuator in which the one-way clutches and the bearing used for rotatably supporting the ball screw shaft on the housing are assembled as separate parts. Additionally, because of a reduced number of parts used, the inventive linear actuator is easy to assemble and adjust, can improve the assembling accuracy, and can be manufactured at a reduced cost.

Obviously, various minor changes and modifications of the present invention are possible in the light of the above teaching. It is therefor to be understood that within the scope of the appended claims the present invention may be practiced otherwise than as specifically described.

What is claimed is:

1. A linear actuator comprising:

a housing member;

a pair of axially opposed bearings with built-in one-way clutch, each of said bearings including
  an outer race and an inner race concentric with said outer race,
  a plurality of rolling elements capable of bearing both a radial and a thrust load and assembled between said outer race and said inner race, and
  a plurality of clutch elements assembled between said outer race and said inner race in juxtaposed relation to said rolling elements in the axial direction of said bearing, said clutch elements being cooperative to permit relative rotation between said outer race and said inner race in one direction only,
  wherein said bearings are assembled in said housing member with the respective outer races firmly connected to said housing member such that a direction in which rotation of the inner race of one of said bearings is locked is opposite to a direction in which rotation of the inner race of the other bearing is locked;

a ball screw shaft extending through the respective inner races of said bearings and relatively and rotatably supported on said inner races with a bearing bushing disposed therebetween, said ball screw shaft having a ball screw portion formed thereon and being driven to rotate in both forward and reverse directions by means of a rotary drive source;

a ball nut threaded with said ball screw portion of said ball screw shaft with a plurality of balls disposed therebetweern;

an actuating member supported by said housing member in such a manner that said actuating member is reciprocally movable in unison with said ball nut in the axial direction of said ball screw shaft for projection and contraction relative to said housing member while it is prevented from rotating about the axis of said ball screw shaft;

a first friction collar and a second friction collar rotatably mounted on said ball screw shaft;

at least one load transmitting collar fixedly mounted on said ball screw shaft, said load transmitting collar having a first end face facing an end face of said inner race of one of said bearings with said first friction collar disposed therebetween, and a second end face facing an end face of said inner race of the other bearing with said second friction collar disposed therebetween, said inner race of said one bearing being locked against rotation when said ball screw shaft is subjected to a first thrust load tending to retract said ball screw shaft, said inner race of said other bearing being locked against rotation when said ball screw shaft is subjected to a second thrust load tending to extend said ball screw shaft, wherein when said ball screw shaft is subjected to said first thrust load, said load transmitting collar transmits the first thrust load through said first friction collar to said inner race of said one bearing, and when said ball screw shaft is subjected to said second thrust load, said load transmitting collar transmits the second thrust load through said second friction collar to said inner race of said other bearing.

2. A linear actuator according to claim 1, wherein said at least one load transmitting collar is a single load transmitting collar disposed between said bearings and having opposite end faces forming said first and second end faces, respectively.

3. A linear actuator according to claim 2, wherein said bearing bushing is composed of two bushing members each associated with one of said bearings, and said first and second friction collars are each formed as an integral part of a corresponding one of said two bushing members.

4. A linear actuator according to claim 1, wherein the number of said load transmitting collar is two, said two load transmitting collars being disposed on opposite sides of said pair of bearings, one of said two load transmitting collars having an end face forming said first end face, and the other load transmitting collar having an end face forming said second end face.

5. A linear actuator according to claim 4, wherein said bearing bushing is composed of two bushing members each associated with one of said bearings, and said first and second friction collars are each formed as an integral part of a corresponding one of said two bushing members.

* * * * *